US011461484B2

(12) United States Patent
Anand et al.

(10) Patent No.: US 11,461,484 B2
(45) Date of Patent: Oct. 4, 2022

(54) CAPTURING CONTEXTUAL INFORMATION FOR DATA ACCESSES TO IMPROVE DATA SECURITY

(71) Applicant: Imperva, Inc., Redwood City, CA (US)

(72) Inventors: Kunal Anand, Marina Del Rey, CA (US); Brian Anderson, San Diego, CA (US); Joe Moore, San Diego, CA (US); Ran Rosin, Ramat Hasharon (IL); Itsik Mantin, Shoham (IL); Peter Klimek, Seattle, WA (US); Craig Burlingame, Mounds View, MN (US)

(73) Assignee: Imperva, Inc., San Mateo, CA (US)

( * ) Notice: Subject to any disclaimer, the term of this patent is extended or adjusted under 35 U.S.C. 154(b) by 327 days.

(21) Appl. No.: 16/730,993

(22) Filed: Dec. 30, 2019

(65) Prior Publication Data

US 2021/0200884 A1     Jul. 1, 2021

(51) Int. Cl.
    *G06F 21/62*       (2013.01)
    *G06F 21/56*       (2013.01)
    *H04L 9/40*        (2022.01)

(52) U.S. Cl.
    CPC .............. *G06F 21/62* (2013.01); *H04L 63/02* (2013.01); *H04L 63/102* (2013.01)

(58) Field of Classification Search
    CPC ........ G06F 21/62; G06F 21/56; G06F 16/953; H04L 63/02; H04L 63/102; H04L 9/40
    See application file for complete search history.

(56) References Cited

U.S. PATENT DOCUMENTS

| 9,210,183 | B2 | 12/2015 | Sadovsky et al. |
| 10,331,898 | B2 | 6/2019 | Nefedov et al. |
| 10,663,961 | B2 | 5/2020 | Spiro et al. |
| 10,992,678 | B1* | 4/2021 | Gilman ............... H04L 61/2015 |
| 11,023,607 | B1 | 6/2021 | Mantin et al. |
| 2007/0136809 | A1* | 6/2007 | Kim ...................... G06F 21/552 726/13 |

(Continued)

OTHER PUBLICATIONS

Imperva, "Database Activity Monitoring User Guide," v13.5, Aug. 28, 2019, pp. 1-65.

(Continued)

*Primary Examiner* — Jayesh M Jhaveri
(74) *Attorney, Agent, or Firm* — Nicholson, De Vos, Webster & Elliott, LLP

(57) ABSTRACT

A method by one or more runtime agents protecting a web application for capturing contextual information for data accesses. The method includes determining first metadata associated with a web application layer request sent by a web application firewall to the web application, determining second metadata associated with the web application layer request based on information available to the web application, serializing the first metadata and the second metadata to generate serialized metadata, and adding the serialized metadata to a database query that is to be submitted by the web application to the database server, wherein execution of the database query that includes the serialized metadata by the database server is to cause the database activity monitor to store the serialized metadata and third metadata associated with the database query determined by the database activity monitor in a data storage.

26 Claims, 6 Drawing Sheets

(56) References Cited

U.S. PATENT DOCUMENTS

| | | | |
|---|---|---|---|
| 2007/0169199 A1* | 7/2007 | Quinnell | G06F 21/577 726/25 |
| 2008/0243524 A1 | 10/2008 | Agrawal et al. | |
| 2009/0106433 A1 | 4/2009 | Knouse et al. | |
| 2010/0318858 A1 | 12/2010 | Essawi et al. | |
| 2013/0291107 A1* | 10/2013 | Marck | G06F 21/552 726/22 |
| 2014/0317741 A1* | 10/2014 | Be'ery | H04L 63/16 726/23 |
| 2016/0337333 A1* | 11/2016 | Rollet | H04L 63/083 |
| 2018/0083987 A1* | 3/2018 | Kislitsin | H04L 63/1416 |
| 2018/0219881 A1* | 8/2018 | Kayacik | H04L 63/02 |
| 2019/0213326 A1* | 7/2019 | Dykes | G06F 21/552 |
| 2019/0334940 A1* | 10/2019 | Bar Noy | H04L 63/20 |
| 2020/0228565 A1* | 7/2020 | Reverte | H04L 43/16 |

OTHER PUBLICATIONS

Chandola, Varun, et al., "Anomaly Detection: A Survey", ACM Computing Surveys, vol. 41, No. 3, Article 15, Jul. 2009, pp. 15:1-15:58.

Notice of Allowance and Fees Due (PTOL-85) for U.S. Appl. No. 15/929,252, dated Jan. 25, 2021, 9 pages.

Sallam, Asmaa, et al., "Detection and syntax centric anomaly detection for relational databases", WIRES Data Mining and Knowledge Discovery, vol. 6, Nov./Dec. 2016, John Wiley & Sons, Ltd., pp. 231-239.

Sallam, Asmaa, et al., "Techniques and Systems for Anomaly Detection", PADG 2018, LNCS 11550, © Springer Nature Switzerland AG, 2019, pp. 113-133.

* cited by examiner

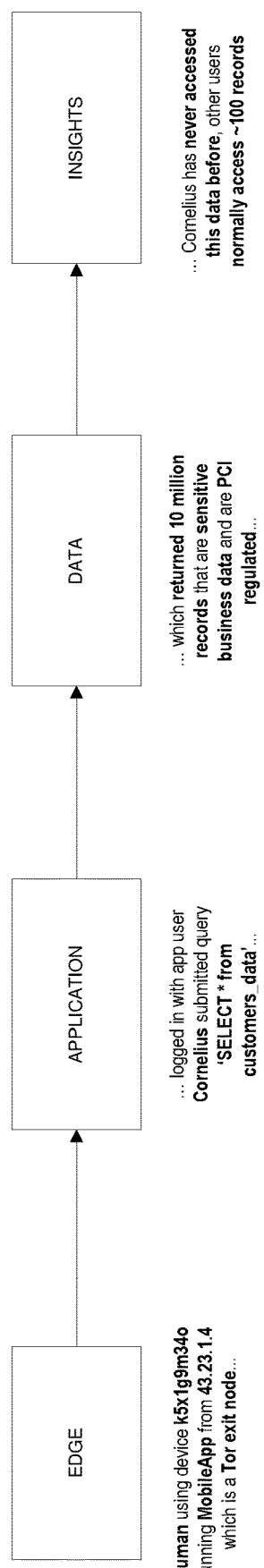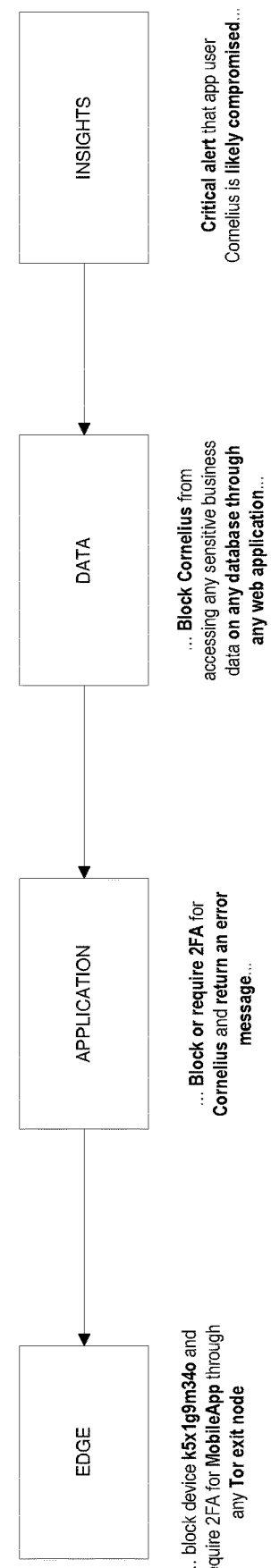

CAPTURING CONTEXTUAL INFORMATION FOR DATA ACCESSES TO IMPROVE DATA SECURITY

TECHNICAL FIELD

Embodiments of the invention relate to the field of data security, and more specifically, to capturing contextual information for data accesses to improve data security.

BACKGROUND

Database servers are computer programs that provide database services to database clients. Many web applications utilize database servers (e.g., database servers that host relational databases to store information received from Hypertext Transfer Protocol (HTTP) clients and/or information to be displayed to HTTP clients). However, other non-web applications may also utilize database servers, including but not limited to accounting software, other business software, or research software. Further, some applications allow for users to submit ad-hoc or defined queries (often using Structured Query Language (SQL)) to the database server. Database servers typically store data using one or more databases. Thus, in some instances a database server can receive a database query from a database client, execute the database query using data stored in the set of one or more database objects (e.g., a table in a relational database) of one or more of the databases, and may potentially return a result (e.g., an indication of success, a value, one or more tuples, etc.).

Databases may be implemented according to a variety of different database models, such as relational (such as PostgreSQL, MySQL, and certain Oracle® products), non-relational, graph, columnar (also known as extensible record; e.g., HBase), object, tabular, tuple store, and multi-model. Examples of non-relational database models (which are also referred to as schema-less and NoSQL) include key-value store and document store (also known as document-oriented as they store document-oriented information, which is also known as semi-structured data). A database may include one or more database objects that are managed by a Database Management System (DBMS). Each database object may include a number of records, and each record may include a set of fields. A record may take different forms based on the database model being used and/or the specific database object to which it belongs; for example, a record may be: 1) a row in a table of a relational database; 2) a JavaScript Object Notation (JSON) document; 3) an Extensible Markup Language (XML) document; 4) a key-value pair; etc. A database object can be unstructured or have a structure defined by the DBMS (a standard database object) and/or defined by a user (a custom database object). In the case of relational databases, each database typically includes one or more database tables (traditionally and formally referred to as "relations"), which are ledger-style (or spreadsheet-style) data structures including columns (often deemed "attributes", or "attribute names") and rows (often deemed "tuples") of data ("values" or "attribute values") adhering to any defined data types for each column.

Enterprises (e.g., businesses, organizations, groups, governmental bodies, or other collective bodies) often use databases to store various data pertaining to those enterprises, some of which may be highly sensitive (e.g., credit card numbers, social security numbers, etc.). An enterprise may use database activity monitoring techniques to monitor the activity of its databases. An enterprise may want to monitor database activity for several reasons. For example, the enterprise may want to monitor database activity to meet regulations and compliance standards for sensitive data accesses, to help with security incident investigations and incident responses, and/or to detect anomalous data accesses. However, performing these tasks properly can become complicated and challenging in large distributed computing environments where the audit trails from different systems/layers are disconnected and difficult to reconstruct.

One of the primary requirements of a database audit process is to provide user accountability (e.g., by identifying which users performed which queries). This is often a difficult task when application users access databases indirectly via applications (e.g., web applications). In these cases, data accesses that were made by different application users (via the application) may be recorded in the database logs as being made by the application itself (e.g., the service account associated with the application), thus making it difficult to link database activity to specific application users. It has been found that a significant amount of enterprise data has been stolen via insecure applications or Application Programming Interfaces (APIs), thus making it critical to be able to link database activity to specific application users.

Conventional approaches attempt to link database activity to specific application users by monitoring both the application traffic (e.g., web traffic) and the database traffic (e.g., the queries being submitted to the database server) and performing statistical correlations between the application traffic and the database traffic. However, since this approach relies on statistical correlations, it can be computationally expensive and inaccurate.

BRIEF DESCRIPTION OF THE DRAWINGS

The invention may best be understood by referring to the following description and accompanying drawings that are used to illustrate embodiments of the invention. In the drawings:

FIG. 3A is a diagram illustrating the stages of a request processing pipeline and contextual information that can be captured at each of the stages, according to some embodiments.

FIG. 3B is a diagram illustrating security responses that can be taken at various stages in the request processing pipeline, according to some embodiments.

DETAILED DESCRIPTION

Figure 1:
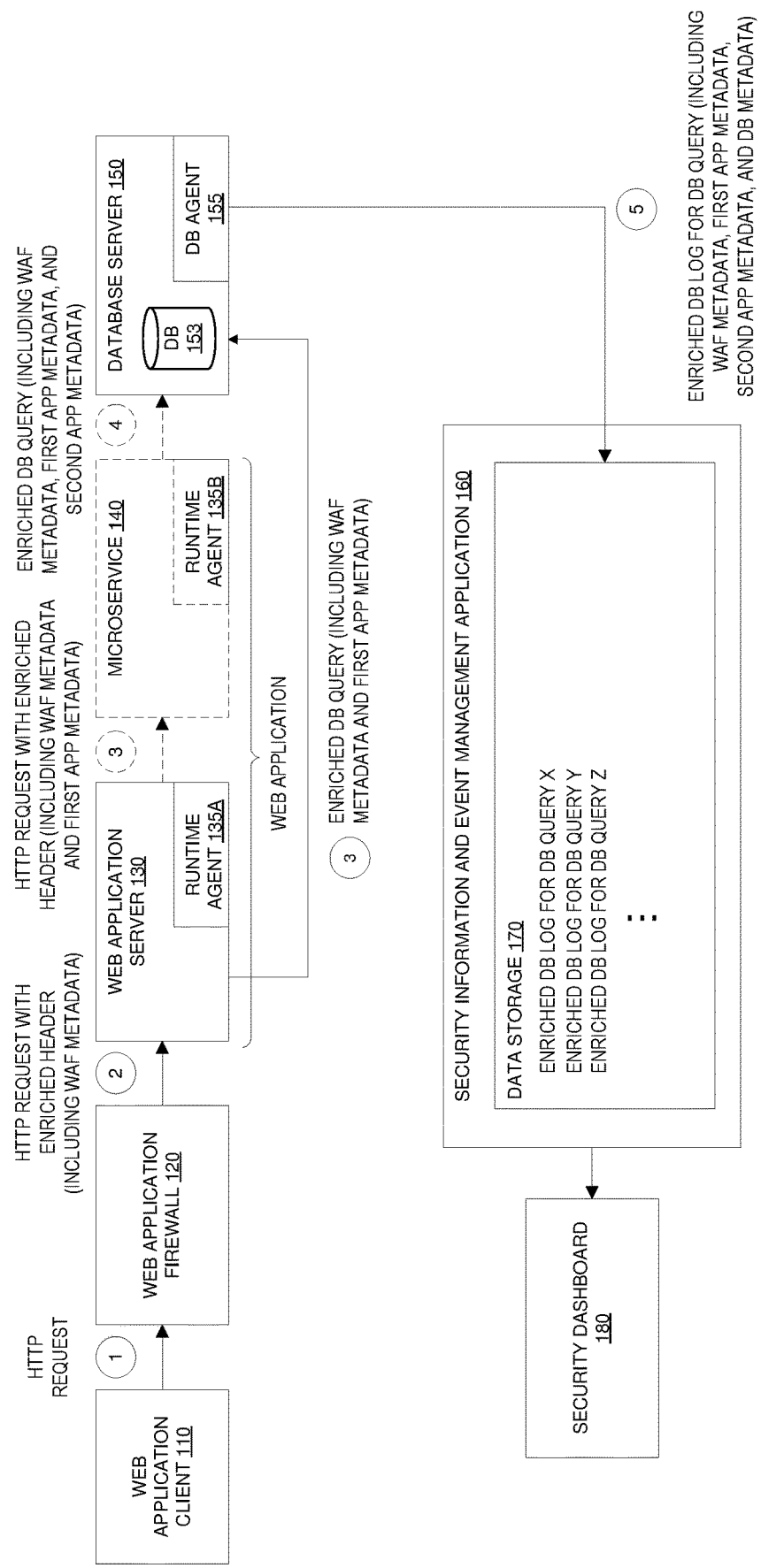
FIG. 1 is a block diagram of a system in which contextual information for data accesses can be captured using a flow enrichment approach, according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, and/or switching), and/or provide support for multiple application services (e.g., data, voice, and video).

As used herein, server end stations are network devices operable to execute or otherwise implement one or more servers providing content or services to clients. For example, server end stations may implement web application servers, database servers, file servers, print servers, mail servers, gaming servers, application servers, and/or Domain Name System (DNS) servers.

As used herein, client end stations (e.g., workstations, laptops, netbooks, palm tops, mobile phones, smartphones, multimedia phones, Voice over Internet Protocol (VoIP) phones, user equipment (UE), terminals, portable media players, Global Positioning Satellite (GPS) units, gaming systems, set-top boxes) are network devices operable to execute or otherwise implement applications that, among other functions, can access the content and/or services provided by servers over a network (e.g., over a local area network (LAN), over the Internet, and/or over virtual private networks (VPNs) overlaid on (e.g., tunneled through) the Internet).

A web application server is system software (e.g., running on top of an operating system) executed by server hardware upon which web applications run. Web application servers may include a web server (e.g. Apache, Microsoft® Internet Information Server (IIS), nginx, lighttpd), which delivers web pages on the request of web application clients (e.g., HyperText Transfer Protocol (HTTP) clients using HTTP), and may also include an application server that executes procedures (i.e., programs, routines, scripts) of a web application. Web applications are computer software applications made up of one or more files including computer code that can run on top of web application servers and are written in a language the web application server supports. Web applications are typically designed to dynamically generate web application layer responses (e.g., HTTP response messages) responsive to web application layer requests (e.g., HTTP request messages) sent by web application clients.

Web applications clients access web applications by sending web application layer requests to web application servers, which execute portions of web applications and return web application data/content (e.g., HyperText Markup Language (HTML) page) in the form of web application layer responses (e.g., HTTP response messages) back to the web application clients, where the web application data/content may be rendered by the web application clients. The web application data/content may include, for example, public web pages (e.g., free content, store fronts, search services) and/or private web pages (e.g., username/password accessed web pages providing email services). Thus, web applications may be provided using a request-response protocol (e.g., HTTP) in a client-server computing model, where the web application servers typically act as the "server" and the web application clients typically act as the "client."

By way of an operational example, a web application client may request a web page from a web application server by sending it an HTTP request message. For example, to access the web page corresponding to the Uniform Resource Locator (URL) of "http://www.example.org/index.html", the web browser may connect to the web application server at www.example.org by sending it an HTTP request message using a "GET" method, which may look like the following:
GET/index.html HTTP/1.1
Host: www.example.org The web application server may reply by sending a set of HTTP headers along with the requested web page, which collectively is called an HTTP response message.

As mentioned above, one of the primary requirements of a database audit process is to provide user accountability (e.g., by identifying which users performed which queries). This is often a difficult task when application users access databases indirectly via applications (e.g., web applications). In these cases, data accesses made by different application users (via the application) may be recorded in the database logs as being made by the application itself (e.g., the service account associated with the application), thus making it difficult to link database activity to specific application users. It has been found that a significant amount of enterprise data has been stolen via insecure applications or Application Programming Interfaces (APIs), thus making it critical to be able to link database activity to specific application users.

Conventional approaches attempt to link database activity to specific application users by monitoring both the application traffic (e.g., web traffic) and the database traffic (e.g., the queries being submitted to the database server) and performing statistical correlations between the application traffic and the database traffic. However, since this approach relies on statistical correlations, it can be computationally expensive and inaccurate.

The present disclosure describes techniques for capturing contextual information for data accesses to improve data security. In an embodiment, the contextual information may include the username of the application user associated with a particular database query submitted to the database server, thereby providing user accountability with regard to that database query. The contextual information may include other information determined/learned at various stages of the request processing pipeline such as information determined/learned at the edge (e.g., by a web application firewall), at the application (e.g., by a runtime agent), and at the database (e.g., by a database agent). The contextual information may be captured using a flow enrichment approach or a distributed tracing approach.

An embodiment is a method implemented by one or more runtime agents for capturing contextual information for data accesses using a flow enrichment approach, where the one or more runtime agents protect a web application that is communicatively coupled between a web application firewall and a database server hosting a database monitored by a database activity monitor. The method includes determining first metadata associated with a web application layer request sent by the web application firewall to the web application, where the first metadata was determined by the web application firewall, determining second metadata associated with the web application layer request based on information available to the web application, serializing the first metadata and the second metadata to generate serialized metadata, and adding the serialized metadata to a database query that is to be submitted by the web application to the database server to access the database as part of the web application processing the web application layer request, where execution of the database query that includes the serialized metadata by the database server is to cause the database activity monitor to store the serialized metadata and third metadata associated with the database query determined by the database activity monitor in a data storage.

Another embodiment is a method implemented by one or more runtime agents for capturing contextual information for data accesses using a distributed tracing approach, where the one or more runtime agents protect a web application that is communicatively coupled between a web application firewall and a database server hosting a database monitored by a database activity monitor. The method includes determining first metadata associated with a web application layer request sent by the web application firewall to the web application, wherein the first metadata was determined by the web application firewall, determining second metadata associated with the web application layer request based on information available to the web application, storing the first metadata and the second metadata in a data storage, associating the first metadata and the second metadata with a trace identifier, and causing the web application to send the trace identifier to the database when the web application submits a database query to the database server to access the database as part of the web application processing the web application layer request, where execution of the database query by the database is to cause the database activity monitor to store third metadata associated with the database query determined by the database activity monitor in the data storage and associate the third metadata with the trace identifier. Various embodiments are further described herein with reference to the accompanying figures.

FIG. 1 is a block diagram of a system in which contextual information for data accesses can be captured using a flow enrichment approach, according to some embodiments. As shown in the diagram, the system includes a web application client 110, a web application firewall 120, a web application server 130, a database server 150, a security information and event management (SIEM) application 160, and a security dashboard 180.

The web application client 110 may access a web application implemented by the web application server 130, for example, by generating one or more web application layer requests (e.g., Hypertext Transfer Protocol (HTTP) request messages such as a "POST" HTTP request messages or "GET" HTTP request messages) and sending these web application layer requests to the web application server 130. In response to receiving web application layer requests, the web application server 130 may send corresponding web application layer responses (e.g., HTTP response messages) containing the data/content of the web application to the web application client 110. The web application client 110 may then render the contents of the web application layer responses (e.g., on a display screen for an end user) or otherwise utilize the contents of the web application layer responses. The web application client 110 may be implemented by a client end station and the web application server may be implemented by one or more server end stations.

For the sake of simplicity and ease of understanding, the diagram shows the system as including a single web application client 110 and a single web application server 130. It should be understood, however, that most practical implementations will include more than one web application client 110 and more than one web application server 130, and that the techniques disclosed herein can scale accordingly.

The web application server 130 may implement a web application or a portion thereof. As shown in the diagram, the web application server 130 includes a runtime agent 135A that provides runtime application self-protection (RASP) functionality for the portion of the web application implemented by the web application server 130. RASP (RASP) is a security technology that uses runtime instrumentation to detect and block attacks by taking advantage of information from inside the running software. This technology differs from perimeter-based protections such as firewalls that detect and block attacks using network-based information and that have minimal or no contextual awareness with regard to the application state/context. The runtime agent 135A may be a RASP plug-in that is integrated as a framework or module that executes in conjunction with application code. Because the runtime agent 135A is integrated into the application code or otherwise tightly integrated with the application code, the runtime agent may have access to information regarding the execution state of the application or other contextual information such as the web application username of the user that is logged in to the web application, the database query being submitted to the database server (e.g., if the web application submits a database query as part of processing a request), a name of the database being accessed, a name of a database table being accessed using a database query, and/or a location (e.g., file name and line number) of web application code that generated and/or submitted the database query to the database server.

In one embodiment, the system further includes a microservice 140 that is communicatively coupled to the web application server 130. The web application server 130 may invoke the microservice 140 to invoke a service that is needed for implementing the web application. The web application server 130 and the microservice 140 may thus collectively implement the web application. Microservices is a software development technique that structures an application as a collection of loosely coupled services. Each of the loosely coupled services may be referred to as a "microservice." The microservice 140 may implement a particular service that implements a portion of the web application. In one embodiment, the service implemented by the microservice 140 may involve accessing a database 153. For example, if the web application server 130 receives a web application layer request from the web application client 110, it may process the request by invoking the microservice 140, which may in turn result in the microservice 140 accessing the database 153. In one embodiment, the microservice 140 includes a runtime agent 135B or is otherwise protected by the runtime agent 135B. The runtime agent 135 may be similar to the runtime agent 135A but configured to protect the microservice 140 (as opposed to protecting the web application server 130). The microservice 140 may be implemented by one or more network devices. While the diagram shows a single microservice 140, it should be understood that other embodiments can include more microservices (e.g., a chain or mesh of microservices) or not use a microservices architecture at all.

The web application firewall 120 is communicatively coupled between the web application client 110 and the web application server 130 to protect the web application server from attacks by the web application client 110. The web application firewall 120 may sit inline to the traffic being sent between the web application client 110 and the web application server 130 such that it can see the traffic being sent between them. The web application firewall 120 may perform security analysis of the traffic being sent between the web application client 110 and the web application server 130, which may involve analyzing traffic (e.g., packets) being sent to the web application server 130 to determine whether the traffic should be allowed to continue traveling through the network to the web application server 130. If the web application firewall 120 detects malicious traffic, it may perform a security response such as preventing the malicious traffic from reaching the protected web application server 130, modifying the malicious traffic (e.g., sanitize it so that it is no longer poses a threat), and/or generating an alert to trigger another responsive event or notify an administrator of the detection of malicious traffic. The web application firewall 120 may protect the web application server 130 against a variety of attacks from the web application clients including, but not limited to, Structured Query Language injection (SQLi) attacks, Cross-Site Request Forgery (CSRF) attacks, and Remote File Inclusion (RFI) Attacks (e.g., based on applying security rules). In addition to protecting the web application server 130 against web application attacks, the web application firewall 120 may provide various other functionality depending on the implementation such as content caching, traffic scrubbing, Internet Protocol (IP) address masking, and/or load balancing. The web application layer firewall 120 may be implemented by one or more network devices.

In one embodiment, the web application firewall 120 determines/learns or otherwise obtains various information regarding the web application layer requests it sees to help it detect malicious web application layer requests. This information may include whether the web application layer request was generated by a human or a bot, the source IP address associated with the web application layer request, the reputation score of the source IP address associated with the web application layer request, the client type (e.g., the browser being used to access the web application) of the web application client that generated the web application layer request, and the geolocation from which the web application layer request originated.

While the diagram shows the system as including a single web application firewall 120, in some embodiments the system may include multiple web application firewalls 120 (e.g., that are geographically dispersed), which are communicatively coupled between web application clients 110 and web application servers 130 to protect the web application servers 130 from attacks. Also, some embodiments may omit the web application firewall 120.

The database server 150 hosts a database 153 and provides access to the database 153. As shown in the diagram, the database server 150 includes a database agent 155 for monitoring the database activity of the database 153. The database agent 155 (also sometimes referred to as a database activity monitoring (DAM) agent) is a piece of software typically installed locally to or close to the database (e.g., in the database server 150 that hosts the database 153) that is configured to monitor the database activity of the database 153. The database agent 155 is typically implemented as a lightweight process to impose minimum overhead on the database server 150. The database agent 155 may perform minimal security analysis on the database traffic it sees and forward the database traffic (or relevant information about the database traffic) to a security analysis server (not shown) for a more in-depth analysis. The security analysis server can perform a more detailed analysis of the database traffic and make various security decisions based on its analysis of the database traffic (e.g., decide whether certain database traffic is suspicious and/or malicious and whether to block and/or generate alerts responsive to such database traffic). The database server may be implemented by one or more network devices.

While the embodiment shown in the diagram uses a database agent 155 to monitor database traffic, other embodiments may utilize different types of database activity monitoring implementations to monitor database traffic. For example, a DAM gateway can be deployed in front of the database server 150 (that sits in-line to the traffic to the database server 150) to monitor database traffic to the database server 150. As another example, a non-in-line sniffer can be deployed to monitor database traffic.

The SIEM 160 provides security information management and security event management functionalities. The SIEM 160 may provide real-time analysis of security alerts generated by applications. The SIEM 160 may store event logs generated by various different applications in data storage 170, correlate the event log data, generate alerts, and perform forensic analysis. In one embodiment, the SIEM 160 provides a security dashboard 180, that provides a graphical user interface (GUI) displaying various security-related information to a user (e.g., a security administrator).

As will be described in further detail herein, in one embodiment, the components of the system are configured to capture contextual information for data accesses using a flow enrichment approach. Exemplary operations for capturing contextual information for data accesses using a flow enrichment approach will now be described with reference to the diagram.

At operation '1' the web application client 110 generates and sends an HTTP request that is intended for the web application server 130 towards the web application server 130 (to access the web application implemented by the web application server 130). The web application firewall 120 intercepts this HTTP request before it reaches the web application server 130 and scans the HTTP request for attacks. In one embodiment, as part of scanning the web application layer request for attacks, the web application firewall 120 determines metadata related to the HTTP request. This metadata may include information related to the HTTP request that is determined by the web application firewall. For example, the metadata may include an indication of whether the web application layer request was generated by a human or a bot, a source IP address associated with the web application layer request, a reputation score of the source IP address associated with the web application layer request, a client type of a web application client that generated the web application layer request, and/or a geolocation from which the web application layer request originated. If the web application firewall 120 determines that the HTTP request may continue traveling towards the web application server 130 (e.g., because the web application firewall determines that the HTTP request does not include an attack and/or is not part of an attack), at circle '2' the web application firewall adds the metadata to the header of the HTTP request and sends the HTTP request with the enriched header (that includes metadata added by the web application firewall) to the web application server 130. The metadata determined and added by the web application firewall may be referred herein as "WAF metadata" (WAF stands for web application firewall).

The web application server 130 may then receive and process the HTTP request. In an embodiment that uses microservices, processing of the HTTP request involves the web application server 130 sending an HTTP request to the microservice 140 to invoke a service implemented by the microservice 140. However, before the web application server 130 sends the HTTP request to the microservice 140, the runtime agent 135A of the web application server 130 adds the WAF metadata it received from the web application firewall to the header of the HTTP request. In addition, the runtime agent 135A may determine its own metadata related to the HTTP request and add this metadata to the HTTP request. This metadata may include information related to the HTTP request that is determined by the runtime agent 135A. For example, this metadata may include a web application username of the user that is logged into the web application. Thus, at circle '3' (with dashed lines) the web application server 130 sends the HTTP request with an enriched header (that includes both the WAF metadata and the metadata added by the runtime agent 135A) to the microservice 140. The metadata determined and added at the web application stage (e.g., at the web application server 130 and/or the microservice 140) may generally be referred herein as "application metadata." In this example, the metadata added at the web application server (by runtime agent 135A) is referred to as "first application metadata" and the metadata added at the microservice 140 (which is further described below) is referred to herein as "second application metadata" to differentiate them from each other.

The microservice 140 may then receive and process the HTTP request. In this example, processing of the HTTP request involves the microservice submitting a database query to the database server 150 to access the database 153. However, before the microservice 140 submits the database query to the database server 150, the runtime agent 135B of the microservice 140 adds the WAF metadata and the first application metadata (the metadata determined at the web application server by runtime agent 135A) to the database query. In addition, the runtime agent 135B may determine its own metadata related to the HTTP request and add this metadata to the database query. For example, the metadata may include the database query being submitted to the database server, a name of the database being accessed, a name of a database table being accessed using a database query, and/or a location (e.g., file name and line number) of web application code that generated and/or submitted the database query to the database server. As mentioned above, the metadata determined and added at the microservice (by runtime agent 13B) is referred to in this example as "second application metadata". Thus, at circle '4' (with dashed lines) the microservice 140 submits the enriched database query (which includes the WAF metadata, the first application metadata, and the second metadata) to the database server 150. In one embodiment, the various metadata (e.g., the WAF metadata, the first application metadata, and/or the second metadata) is serialized (e.g., into a string) and added to the database query as part of a comment field (e.g., between comment delimiters such as "/*" and "*/") so that it does not get executed when processed by the database server 150.

Circles '3' and '4' (with dashed lines) refer to operations that are performed in a web application architecture that uses microservices (which is optional). In an embodiment where microservices is not used (and even in some cases where microservices are used), the web application server 130 itself may submit a database query to the database server 150 to access the database 153. In such an embodiment, at circle '3' (with solid lines) the web application server 130 itself may submit an enriched database query (which includes the WAF metadata and the first application metadata) to the database server 150 (e.g., by serializing the metadata and adding it to the database query as part of a comment field).

The database server 150 may then receive the database query and execute the database query. The execution of the database query causes the database agent 155 to generate a database log for the database query. This database log may include the WAF metadata, the first application metadata, the second application metadata (e.g., if the microservice 140 is used/invoked) (e.g., which are extracted from the comment field of the database query), as well as additional metadata determined at the database server 150 by the database agent 155. This metadata may include the database query submitted to the database, a name of the database, a name of a database table being accessed using the database query, a database username, a sensitivity score of data being accessed using the database query, and a number of records returned by the database. The metadata added at the database server 150 (by the database agent 155) may be referred to herein as "database metadata."

At circle '5' the database agent 155 stores the enriched database log (which includes the WAF metadata, the first application metadata, the second application metadata (e.g., if the microservice 140 is used/invoked), and the database metadata) in the data storage 170 of the SIEM 160. The data storage 170 of the SIEM 160 may store multiple such enriched database logs for multiple database queries that were previously submitted to the database server 150. In the example shown in the diagram, the data storage of the SIEM stores enriched database logs for database queries X, Y, Z (among other database queries). The SIEM may parse/analyze these database logs and display various information/insights regarding the database logs to a user of the SIEM (e.g., a security administrator) via the security dashboard. For example, the SIEM may display information regarding which web application users are associated with the data accesses, thereby providing user accountability with regard to those data accesses.

Operations have been described above for capturing contextual information for data accesses using a flow enrichment approach. Another approach that can be used to capture contextual information for data accesses is a distributed tracing approach. Exemplary operations for capturing contextual information for data accesses using a distributed tracing approach are described below with reference to FIG. 2.

Figure 2:
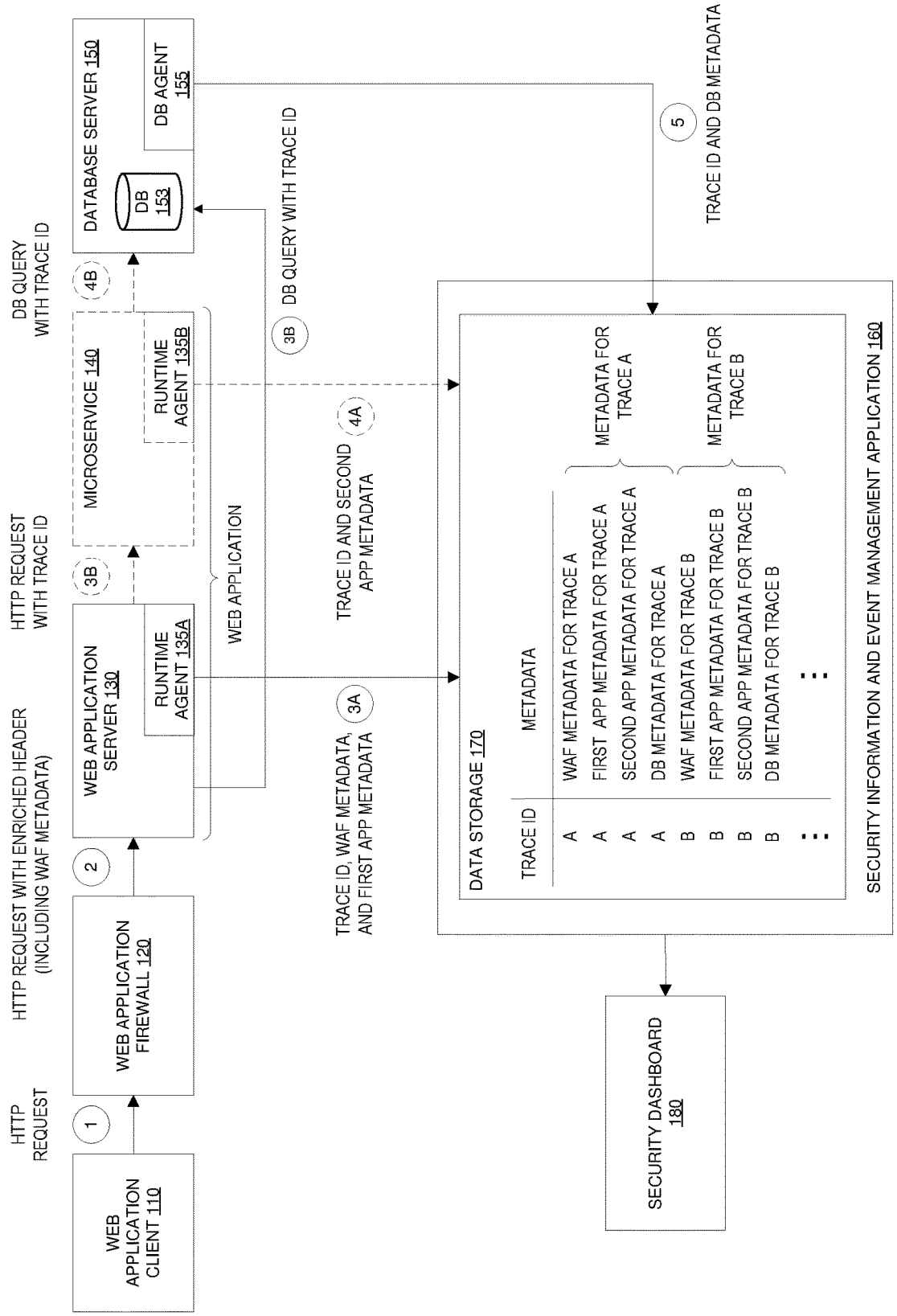
FIG. 2 is a block diagram of a system in which contextual information for data accesses can be captured using a distributed tracing approach, according to some embodiments.

FIG. 2 is a block diagram of a system in which contextual information for data accesses can be captured using a distributed tracing approach, according to some embodiments. The system includes similar components as the system shown in FIG. 1 such as the web application client 110, the web application firewall 120, the web application server 130, the microservice 140, the database server 150, the SIEM 160, and the security dashboard 180. The descriptions of these components are largely omitted here for the sake of avoiding repetition. As will be described in further detail herein, in one embodiment, the components are configured to capture contextual information for data accesses using a distributed tracing approach. Exemplary operations for capturing contextual information for data accesses using a distributed tracing approach will now be described with reference to the diagram.

At operation '1' the web application client 110 generates and sends an HTTP request that is intended for the web application server 130 towards the web application server 130 (to access the web application implemented by the web application server 130). The web application firewall 120 intercepts this HTTP request before it reaches the web application server 130 and scans the HTTP request for attacks. In one embodiment, as part of scanning the web application layer request for attacks, the web application firewall 120 determines metadata related to the HTTP request (i.e., WAF metadata). If the web application firewall 120 determines that the HTTP request may continue traveling towards the web application server 130 (e.g., because the web application firewall 120 determines that the HTTP request does not include an attack and/or is not part of an attack), at circle '2' the web application firewall 120 adds the WAF metadata to the header of the HTTP request and sends the HTTP request with the enriched header (that includes the WAF metadata) to the web application server 130.

The web application server 130 may then receive and process the HTTP request. In conjunction with the web application server 130 processing the HTTP request, the runtime agent 135A of the web application server 130 generates a trace identifier (ID) associated with the web application layer request and determines metadata related to the HTTP request (i.e., first application metadata). At circle '3A' the runtime agent 135A stores the WAF metadata (received from the web application firewall) and the first application metadata in the data storage 170 of the SIEM 160 and associates these metadata with the trace identifier.

In an embodiment that uses microservices, processing of the HTTP request involves the web application server 130 sending an HTTP request to the microservice 140 to invoke a service implemented by the microservice 140. However, before the web application server 130 sends the HTTP request to the microservice 140, the runtime agent 135A adds the trace identifier associated with the web application layer request to the header of the HTTP request. At circle '3B' (with dashed lines) the web application server 130 sends the HTTP request with the trace identifier in the header to the microservice 140.

The microservice 140 may then receive and process the HTTP request. In conjunction with the microservice 140 processing the HTTP request, the runtime agent 135B of the microservice 140 determines metadata related to the HTTP request (i.e., second application metadata). At circle '4A' the runtime agent 135B stores the second application metadata in the data storage of the SIEM and associates the second application metadata with the trace identifier received from the web application server 130.

In this example, processing of the HTTP request involves the microservice 140 submitting a database query to the database server 150 to access the database 153. However, before the microservice 140 submits the database query to the database server 150, runtime agent 135B adds the trace identifier (received from the web application server 130) to the database query (e.g., as part of a comment field in the database query). At circle '4B' the microservice 140 submits the database query with the trace identifier to the database server 150.

Circles '3B,' '4A,' and '4B' (with dashed lines) refer to operations that are performed in a web application architecture that uses microservices (which is optional). In an embodiment where microservices is not used (and even in some cases where microservices are used), the web application server 130 itself may submit a database query to the database server 150 to access the database 153. In such an embodiment, at circle '3B' (with solid lines) the web application server 130 itself may submit a database query with the trace identifier to the database server 150.

The database server 150 may then receive the query and execute the query. At circle '5' the database agent 155 determines database metadata and stores the database metadata in the data storage of the SIEM and associates the database metadata with the trace identifier (received from the microservice 140 as part of the database query). As a result, the data storage 170 of the SIEM 160 stores WAF metadata, first application metadata, second application metadata (e.g., if the microservice 140 is used/invoked), and/or database metadata for the trace identifier associated with the web application layer request. The data storage 170 of the SIEM may store such metadata for multiple requests or traces. In the example shown in the diagram, the data storage of the SIEM stores WAF metadata, first application metadata, second application metadata, and database metadata for traces A and B (among other traces), respectively. The SIEM 160 may parse/analyze this metadata and display various information/insights regarding the metadata to a user of the SIEM (e.g., a security administrator) via the security dashboard. For example, the SIEM may display information regarding which web application users made which data accesses (via the web application) based on analyzing the metadata for the different traces, thereby providing user accountability with regard to those data accesses.

While the systems described above include a web application firewall 120, some embodiments may omit the web application firewall 120. In such embodiments, the web application server 130 may send an HTTP request to the microservice 140 or the database server 150 with an enriched header that includes the first application metadata but does not include WAF metadata (e.g., at circle '3' of FIG. 1) or store the first application metadata in the data storage 170 of the SIEM 160 without WAF metadata (e.g., at circle '3A' of FIG. 2).

A benefit of embodiments described herein is that contextual information for data accesses is determined and aggregated at runtime (e.g., during the request processing) across multiple components and made accessible to the user (e.g., a security administrator), thereby avoiding the need to perform statistical correlations. As a result, embodiments are able to accurately link database activity to specific application users more accurately and using less computational resources (compared to solutions that rely on performing statistical correlations). Another benefit of embodiments described herein is that contextual information captured across different stages of the request processing pipeline are aggregated in a single place (e.g., in data storage 170), which makes it easier for security personnel to perform security audits and security incident investigations (compared to conventional solutions where the security personnel needs to pull event logs from various different components in the request processing pipeline and correlate the information in these event logs to determine what happened). Various other advantages will be apparent to those skilled in the art based on the present disclosure.

One or more components of the system may be deployed in a cloud (e.g., a cloud provided by a cloud provider such as Amazon®, Microsoft®, etc.) and/or on premise (e.g., in an enterprise network). In an exemplary arrangement, the web application firewall 120 is deployed in the cloud 195 while the web application server 130 is deployed on-premise, and any web application layer requests originated by the web application client 110 that are intended for the web application server 130 are first directed to the web application firewall 120 in the cloud (e.g., by changing Domain Name Service (DNS) records) before being sent to the on-premise web application server 130. It should be understood that other deployments are also possible. For example, both the web application layer firewall 120 and the web application servers 130 may be deployed in the cloud or both may be deployed on-premise. Also, the database server 150 and/or the SIEM 160 may be deployed in the cloud or deployed on-premise.

FIG. 3A is a diagram illustrating the stages of a request processing pipeline and contextual information that can be captured at each of the stages, according to some embodiments. As shown in the diagram, the request processing pipeline includes the edge stage, the application stage, the data stage, and the insights stage. At the edge stage (e.g., at a web application firewall 120), it is determined that a human user using a device having the fingerprint of "k5x1g9m34o" running "MobileApp" from IP address "43.23.1.4," which is a Tor exit node, is attempting to access a web application. At the application stage (e.g., at the web application server 130 and/or microservice 140), it is determined that the user is logged into the web application using the username "Cornelius" and submitted the query "SELECT * from customers_data." At the data stage (e.g., at the database server 150), it is determined that the query returned 10 million records that are classified as sensitive business data and are Payment Card Industry (PCI) regulated. At the insights stage (e.g., at the SIEM 160), it is determined that the username "Cornelius" has never accessed this data before and that other users that have accessed the same/similar data typically access approximately 100 records. In one embodiment, as will be further described herein (e.g., with reference to FIG. 3B), the contextual information captured at the various stages can be used to better detect attacks and/or to provide a better security response.

FIG. 3B is a diagram illustrating security responses that can be taken at various stages in the request processing pipeline, according to some embodiments. The diagram illustrates exemplary security responses that can be taken in response to the contextual information captured in FIG. 3A. At the insights stage (e.g., at the SIEM 160), a critical alert is generated indicating that the username "Cornelius" is likely compromised (e.g., because this user's behavior is anomalous). At the data stage (e.g., at the database server 150), the username "Cornelius" is blocked from accessing any sensitive business data in any database through any web application. At the application stage (e.g., at the web application server 130 or microservice 140), username "Cornelius" is blocked or requires two-factor authentication (2FA). Also, an error message may be generated to the user indicating that access is not allowed. At the edge stage (e.g., at the web application firewall 120), the device having the fingerprint of "k5x1g9m34o" is blocked and 2FA is required for any device running "MobileApp" through any Tor exit node.

A benefit of embodiments described herein is that the capturing of contextual information allows for better detection of anomalous behavior and allows for more tailored security responses (resulting in less false positives). For example, with conventional solutions, it would not be possible (or at least very difficult) to determine that the username "Cornelius" is compromised because the system does not have visibility into which application users are making which data accesses via the application. However, with embodiments described herein, application usernames can be linked to individual database queries, making it possible to determine which particular application user is making malicious or anomalous data accesses. Also, having knowledge of the particular application user that is likely compromised allows embodiments to provide a tailored security response that blocks just that particular application user (or users having a similar profile to that application user) from making additional data accesses via the application. Conventional solutions that do not have such visibility would likely respond to a known/likely compromise by blocking the service account associated with the application (which would result in all application users being blocked from making data accesses via the application, which would result in a large number of false positives) or by not blocking at all until after pinpointing which application user(s) are compromised, which may take a long time (which may result in more data being compromised during that time).

Figure 4:
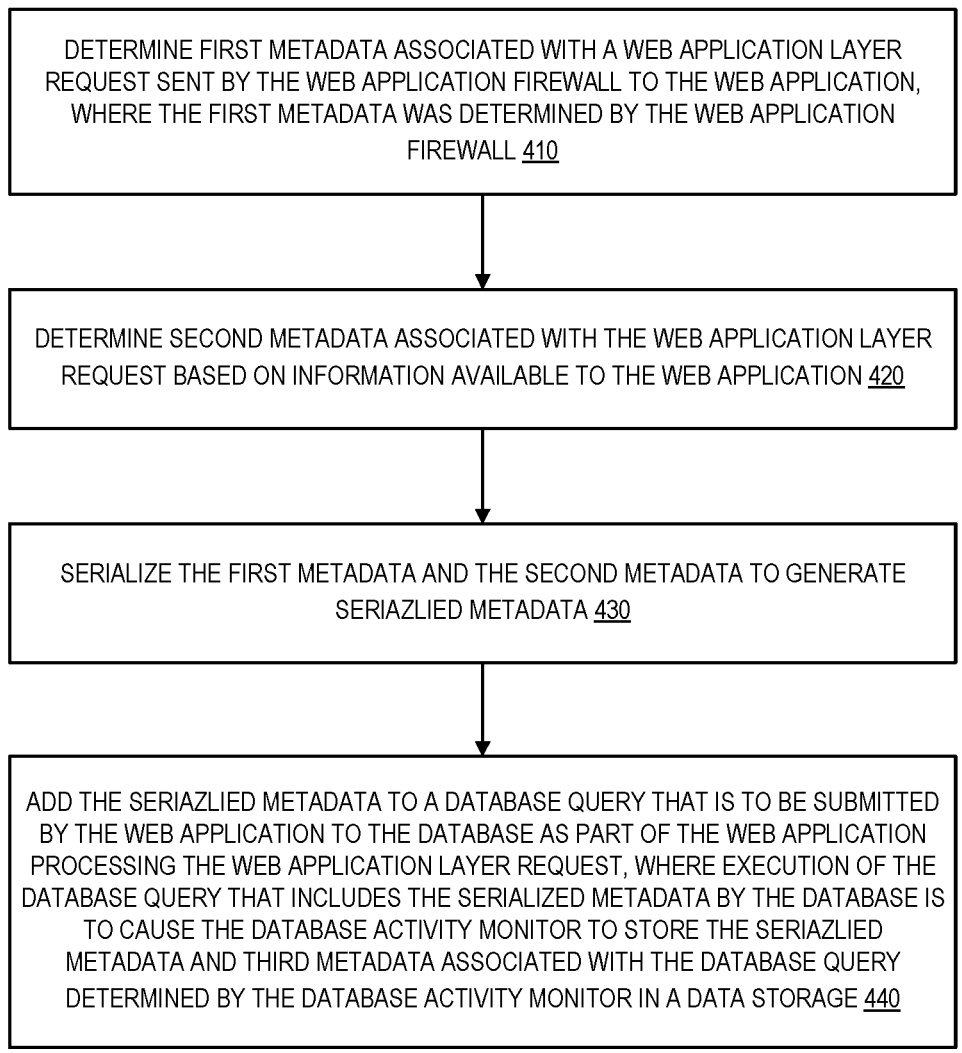
FIG. 4 is a flow diagram of a process for capturing contextual information using a flow enrichment approach, according to some embodiments.

FIG. 4 is a flow diagram of a process for capturing contextual information using a flow enrichment approach, according to some embodiments. In one embodiment, the process is implemented by one or more runtime agents (e.g., runtime agent 135A and/or runtime agent 13B) implemented by one or more network devices, where the one or more runtime agents protect a web application that is communicatively coupled to a web application firewall and a database server hosting a database monitored by a database activity monitor (e.g., a database agent 155). The process may be implemented using hardware, software, firmware, or any combination thereof.

At block 410, the one or more runtime agents determine first metadata associated with a web application layer request sent by the web application firewall to the web application, where the first metadata was determined by the web application firewall. In one embodiment, the first metadata that was determined by the web application firewall includes one or more of: an indication of whether the web application layer request was generated by a human or a bot, a source IP address associated with the web application layer request, a reputation score of the source IP address associated with the web application layer request, a client type of a web application client that generated the web application layer request, and a geolocation from which the web application layer request originated. In one embodiment, the first metadata that was determined by the web application firewall is included in a header of the web application layer request sent by the web application firewall to the web application.

At block 420, the one or more runtime agents determine second metadata associated with the web application layer request based on information available to the web application. In one embodiment, the second metadata determined by the one or more runtime agents includes a web application username. Additionally or alternatively, in one embodiment, the second metadata determined by the one or more runtime agents includes one or more of: the database query, a name of the database, a name of a database table being accessed using the database query, and a location of web application code that generated or submitted the database query.

At block 430, the one or more runtime agents serialize the first metadata and the second metadata to generate serialized metadata.

At block 440, the one or more runtime agents add the serialized metadata to a database query that is to be submitted by the web application to the database server to access the database as part of the web application processing the web application layer request, where execution of the database query that includes the serialized metadata by the database is to cause the database activity monitor (e.g., a database agent 155) to store the serialized metadata and third metadata associated with the database query determined by the database activity monitor in a data storage. In one embodiment, the third metadata associated with the database query determined by the database activity monitor includes one or more of the database query submitted to the database, a name of the database, a name of a database table being accessed using the database query, a database username, a sensitivity score of data being accessed using the database query, and a number of records returned by the database. In one embodiment, the serialized metadata is added to the database query in a comment field of the database query so that the serialized metadata is not executed by the database server.

In one embodiment, the one or more runtime agents implement a security response (e.g., which was determined by the SIEM or security personnel based on analyzing the metadata). For example, the one or more runtime agents may receive an instruction (e.g., from the SIEM) to block a specified web application user and activate a mechanism for blocking the specified web application user in response to receiving the instruction.

Figure 5:
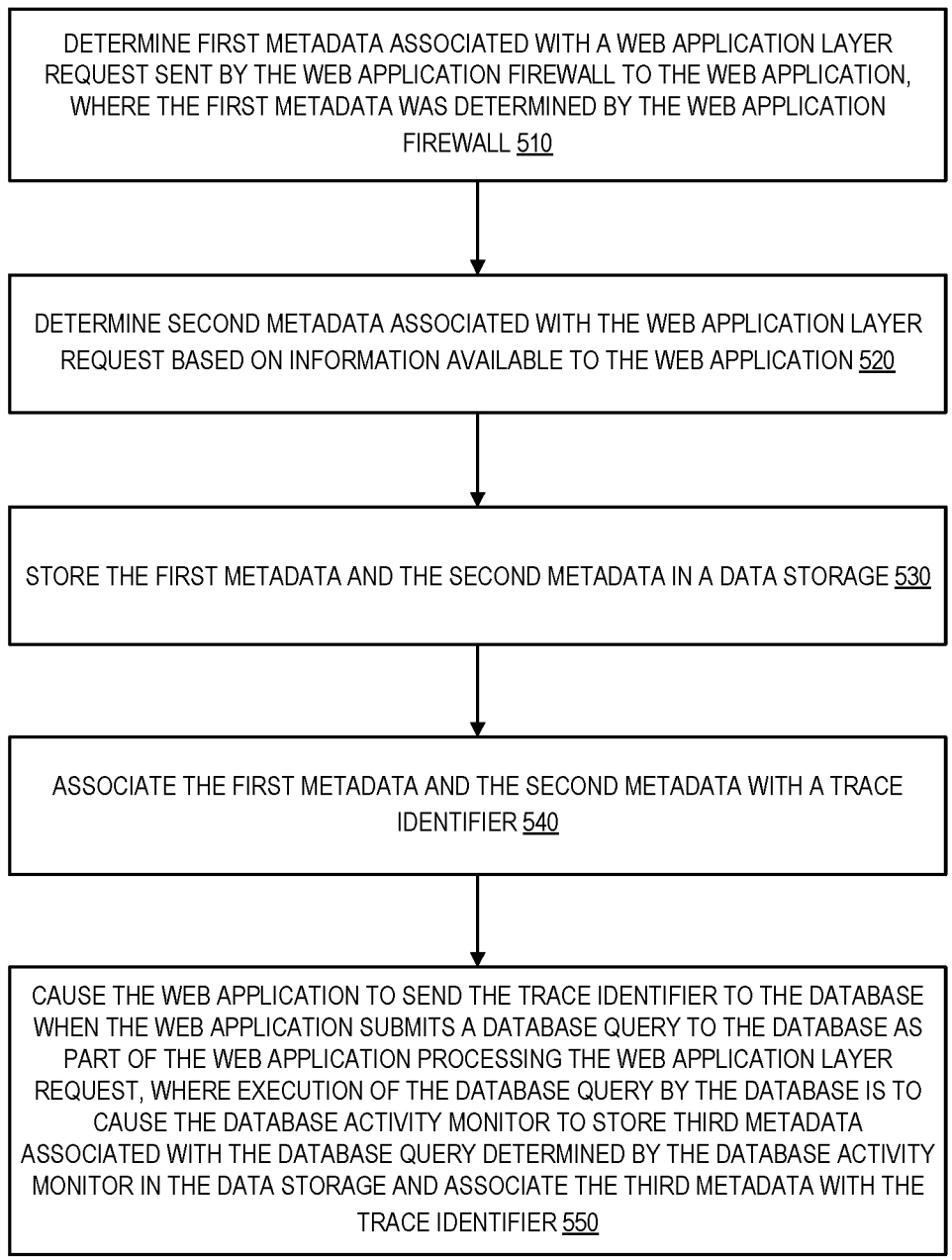
FIG. 5 is a flow diagram of a process for capturing contextual information using a distributed tracing approach, according to some embodiments.

FIG. 5 is a flow diagram of a process for capturing contextual information using a distributed tracing approach, according to some embodiments. In one embodiment, the process is implemented by one or more runtime agents (e.g., runtime agent 135A and/or runtime agent 13B) implemented by one or more network devices, where the one or more runtime agents protect a web application that is communicatively coupled to a web application firewall and a database monitored by a database activity monitor (e.g., a database agent 155). The process may be implemented using hardware, software, firmware, or any combination thereof.

At block 510, the one or more runtime agents determine first metadata associated with a web application layer request sent by the web application firewall to the web application, where the first metadata was determined by the web application firewall. In one embodiment, the first metadata that was determined by the web application firewall includes one or more of: an indication of whether the web application layer request was generated by a human or a bot, a source IP address associated with the web application layer request, a reputation score of the source IP address associated with the web application layer request, a client type of a web application client that generated the web application layer request, and a geolocation from which the web application layer request originated.

At block 520, the one or more runtime agents determine second metadata associated with the web application layer request based on information available to the web application. In one embodiment, the second metadata determined by the one or more runtime agents includes a web application username. Additionally or alternatively, in one embodiment, the second metadata determined by the one or more runtime agents includes one or more of: the database query, a name of the database, a name of a database table being accessed using the database query, and a location of web application code that generated or submitted the database query.

At block 530, the one or more runtime agents store the first metadata and the second metadata in a data storage and at block 540 associate the first metadata and the second metadata with a trace identifier. In one embodiment, the trace identifier is generated by the one or more runtime agents.

At block 550, the one or more runtime agents cause the web application to send the trace identifier to the database server when the web application submits a database query to the database server to access the database as part of the web application processing the web application layer request, where execution of the database query by the database is to cause the database activity monitor to store third metadata associated with the database query determined by the database activity monitor in the data storage and associate the third metadata with the trace identifier. In one embodiment, the third metadata associated with the database query determined by the database activity monitor includes one or more of: the database query submitted to the database server, a name of the database, a name of a database table being accessed using the database query, a database username, a sensitivity score of data being accessed using the database query, and a number of records returned by the database.

In one embodiment, the one or more runtime agents implement a security response (e.g., which was determined by the SIEM or security personnel based on analyzing the metadata). For example, the one or more runtime agents may receive an instruction (e.g., from the SIEM) to block a specified web application user and activate a mechanism for blocking the specified web application user in response to receiving the instruction.

Figure 6:
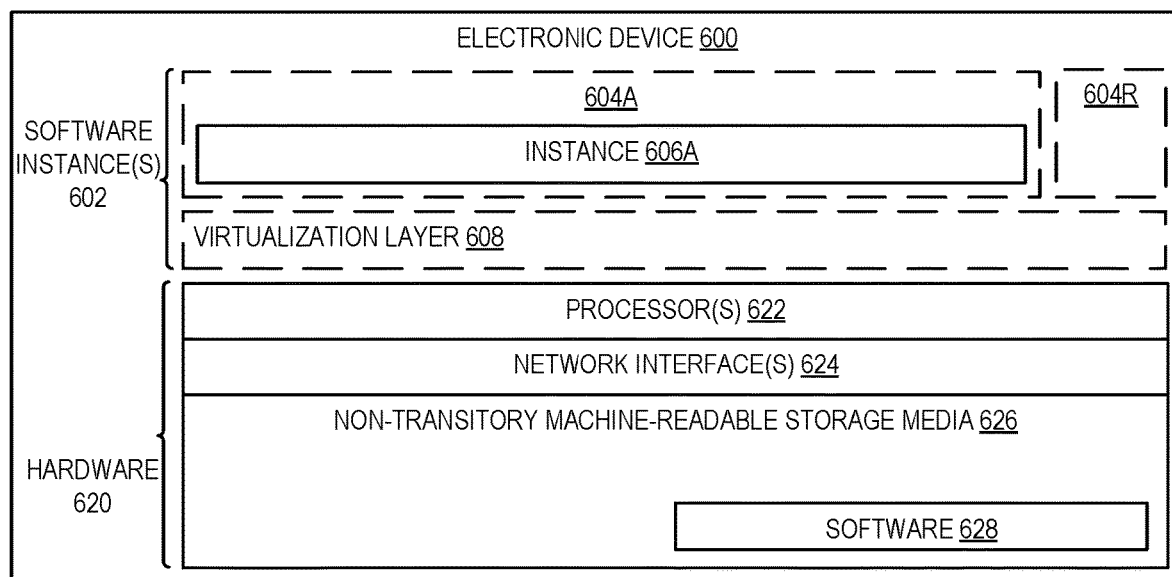
FIG. 6 is a block diagram illustrating an electronic device, according to some embodiments.

FIG. 6 is a block diagram illustrating an electronic device, according to some embodiments. FIG. 6 illustrates hardware 620 comprising a set of one or more processor(s) 622, a set of one or more network interfaces 624 (wireless and/or wired), and non-transitory machine-readable storage medium/media 626 having stored therein software 628 (which includes instructions executable by the set of one or more processor(s) 622). Software 628 can include code, which when executed by hardware 620, causes the electronic device 600 to perform operations of one or more embodiments described herein (e.g., operations for capturing contextual information for data accesses). Thus, as previously described, the web application client 110, the web application firewall 120, the web application server 130, the microservice 140, the database server 150, and/or the SIEM 160 may each be implemented using one or more electronic devices.

In electronic devices that use compute virtualization, the set of one or more processor(s) 622 typically execute software to instantiate a virtualization layer 608 and software container(s) 604A-R (e.g., with operating system-level virtualization, the virtualization layer 608 represents the kernel of an operating system (or a shim executing on a base operating system) that allows for the creation of multiple software containers 604A-R (representing separate user space instances and also called virtualization engines, virtual private servers, or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers 604A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 628 (illustrated as instance 606A) is executed within the software container 604A on the virtualization layer 608. In electronic devices where compute virtualization is not used, the instance 606A on top of a host operating system is executed on the "bare metal" electronic device 600. The instantiation of the instance 606A, as well as the virtualization layer 608 and software containers 604A-R if implemented, are collectively referred to as software instance(s) 602.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

The operations in the flow diagrams have been described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Similarly, while the flow diagrams in the figures show a particular order of operations performed by certain embodiments, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method by one or more runtime agents implemented by one or more network devices for capturing contextual information for data accesses using flow enrichment, wherein the one or more runtime agents protect a web application that is communicatively coupled to a web application firewall and a database server hosting a database monitored by a database activity monitor, the method comprising:
    determining first metadata associated with a web application layer request sent by the web application firewall to the web application, wherein the first metadata was determined by the web application firewall;
    determining second metadata associated with the web application layer request based on information available to the web application;
    serializing the first metadata and the second metadata to generate serialized metadata; and
    adding the serialized metadata to a database query that is to be submitted by the web application to the database server to access the database as part of the web application processing the web application layer request, wherein execution of the database query that includes the serialized metadata by the database server is to cause the database activity monitor to store the serialized metadata and third metadata associated with the database query determined by the database activity monitor in a data storage.

2. The method of claim 1, wherein the first metadata that was determined by the web application firewall includes one or more of: an indication of whether the web application layer request was generated by a human or a bot, a source Internet Protocol (IP) address associated with the web application layer request, a reputation score of the source IP address associated with the web application layer request, a client type of a web application client that generated the web application layer request, and a geolocation from which the web application layer request originated.

3. The method of claim 1, wherein the second metadata determined by the one or more runtime agents includes a web application username.

4. The method of claim 3, wherein the second metadata determined by the one or more runtime agents further includes one or more of: the database query, a name of the database, a name of a database table being accessed using the database query, and a location of web application code that generated or submitted the database query.

5. The method of claim 1, wherein the third metadata associated with the database query determined by the database activity monitor includes one or more of: the database query submitted to the database, a name of the database, a name of a database table being accessed using the database query, a database username, a sensitivity score of data being accessed using the database query, and a number of records returned by the database.

6. The method of claim 1, wherein the serialized metadata is added to the database query in a comment field of the database query so that the serialized metadata is not executed by the database server.

7. The method of claim 1, wherein the first metadata that was determined by the web application firewall is included in a header of the web application layer request sent by the web application firewall to the web application.

8. The method of claim 1, further comprising:
receiving an instruction to block a specified web application user; and
activating a mechanism for blocking the specified web application user.

9. A method by one or more runtime agents implemented by one or more network devices for capturing contextual information for data accesses using distributed tracing, wherein the one or more runtime agents protect a web application that is communicatively coupled to a web application firewall and a database server hosting a database monitored by a database activity monitor, the method comprising:
determining first metadata associated with a web application layer request sent by the web application firewall to the web application, wherein the first metadata was determined by the web application firewall;
determining second metadata associated with the web application layer request based on information available to the web application;
storing the first metadata and the second metadata in a data storage;
associating the first metadata and the second metadata with a trace identifier associated with the web application layer request; and
causing the web application to send the trace identifier to the database when the web application submits a database query to the database server to access the database as part of the web application processing the web application layer request, wherein execution of the database query by the database is to cause the database activity monitor to store third metadata associated with the database query determined by the database activity monitor in the data storage and associate the third metadata with the trace identifier.

10. The method of claim 9, wherein the first metadata that was determined by the web application firewall includes one or more of: an indication of whether the web application layer request was generated by a human or a bot, a source Internet Protocol (IP) address associated with the web application layer request, a reputation score of the source IP address associated with the web application layer request, a client type of a web application client that generated the web application layer request, and a geolocation from which the web application layer request originated.

11. The method of claim 9, wherein the second metadata determined by the one or more runtime agents includes a web application username.

12. The method of claim 11, wherein the second metadata determined by the one or more runtime agents further includes one or more of: the database query, a name of the database, a name of a database table being accessed using the database query, and a location of web application code that generated or submitted the database query.

13. The method of claim 9, wherein the third metadata associated with the database query determined by the database activity monitor includes one or more of: the database query submitted to the database server, a name of the database, a name of a database table being accessed using the database query, a database username, a sensitivity score of data being accessed using the database query, and a number of records returned by the database.

14. The method of claim 9, wherein the trace identifier is generated by the one or more runtime agents.

15. A set of one or more non-transitory machine-readable storage media storing instructions which, when executed by one or more processors of one or more network devices implementing one or more runtime agents protecting a web application that is communicatively coupled to a web application firewall and a database server hosting a database monitored by a database activity monitor, causes the one or more network devices to perform operations for capturing contextual information for data accesses using flow enrichment, the operations comprising:
determining first metadata associated with a web application layer request sent by the web application firewall to the web application, wherein the first metadata was determined by the web application firewall;
determining second metadata associated with the web application layer request based on information available to the web application;
serializing the first metadata and the second metadata to generate serialized metadata; and
adding the serialized metadata to a database query that is to be submitted by the web application to the database server to access the database as part of the web application processing the web application layer request, wherein execution of the database query that includes the serialized metadata by the database server is to cause the database activity monitor to store the serialized metadata and third metadata associated with the database query determined by the database activity monitor in a data storage.

16. The set of one or more non-transitory machine-readable storage media of claim 15, wherein the second metadata determined by the one or more runtime agents includes a web application username.

17. The set of one or more non-transitory machine-readable storage media of claim 15, wherein the serialized metadata is added to the database query in a comment field of the database query so that the serialized metadata is not executed by the database server.

18. A set of one or more non-transitory machine-readable storage media storing instructions which, when executed by one or more processors of one or more network devices implementing one or more runtime agents protecting a web application that is communicatively coupled to a web application firewall and a database server hosting a database monitored by a database activity monitor, causes the one or more network devices to perform operations for capturing contextual information for data accesses using distributed tracing, the operations comprising:

determining first metadata associated with a web application layer request sent by the web application firewall to the web application, wherein the first metadata was determined by the web application firewall;

determining second metadata associated with the web application layer request based on information available to the web application;

storing the first metadata and the second metadata in a data storage;

associating the first metadata and the second metadata with a trace identifier associated with the web application layer request; and causing the web application to send the trace identifier to the database when the web application submits a database query to the database server to access the database as part of the web application processing the web application layer request, wherein execution of the database query by the database is to cause the database activity monitor to store third metadata associated with the database query determined by the database activity monitor in the data storage and associate the third metadata with the trace identifier.

19. The set of one or more non-transitory machine-readable storage media of claim 18, wherein the second metadata determined by the one or more runtime agents includes a web application username.

20. The set of one or more non-transitory machine-readable storage media of claim 18, wherein the trace identifier is generated by the one or more runtime agents.

21. A network device configured to implement a runtime agent that protects a web application that is communicatively coupled to a web application firewall and a database server hosting a database monitored by a database activity monitor, wherein the runtime agent is configured to capture contextual information for data accesses using flow enrichment, the network device comprising:

one or more processors; and a non-transitory machine-readable storage medium having instructions stored therein, which when executed by the one or more processors, causes the network device to:

determine first metadata associated with a web application layer request sent by the web application firewall to the web application, wherein the first metadata was determined by the web application firewall, determine second metadata associated with the web application layer request based on information available to the web application, serialize the first metadata and the second metadata to generate serialized metadata, and add the serialized metadata to a database query that is to be submitted by the web application to the database server to access the database as part of the web application processing the web application layer request, wherein execution of the database query that includes the serialized metadata by the database server is to cause the database activity monitor to store the serialized metadata and third metadata associated with the database query determined by the database activity monitor in a data storage.

22. The network device of claim 21, wherein the second metadata determined by the one or more runtime agents includes a web application username.

23. The network device of claim 21, wherein the serialized metadata is added to the database query in a comment field of the database query so that the serialized metadata is not executed by the database server.

24. A network device configured to implement a runtime agent that protects a web application that is communicatively coupled to a web application firewall and a database server hosting a database monitored by a database activity monitor, wherein the runtime agent is configured to capture contextual information for data accesses using distributed tracing, the network device comprising:

one or more processors; and a non-transitory machine-readable storage medium having instructions stored therein, which when executed by the one or more processors, causes the network device to:

determine first metadata associated with a web application layer request sent by the web application firewall to the web application, wherein the first metadata was determined by the web application firewall, determine second metadata associated with the web application layer request based on information available to the web application, store the first metadata and the second metadata in a data storage, associate the first metadata and the second metadata with a trace identifier associated with the web application layer request, and cause the web application to send the trace identifier to the database when the web application submits a database query to the database server to access the database as part of the web application processing the web application layer request, wherein execution of the database query by the database is to cause the database activity monitor to store third metadata associated with the database query determined by the database activity monitor in the data storage and associate the third metadata with the trace identifier.

25. The network device of claim 24, wherein the second metadata determined by the one or more runtime agents includes a web application username.

26. The network device of claim 24, wherein the trace identifier is generated by the one or more runtime agents.

* * * * *